(No Model.)
I. F. STERLING.
CHURN DASHER.
No. 446,718. Patented Feb. 17, 1891.
Fig I.
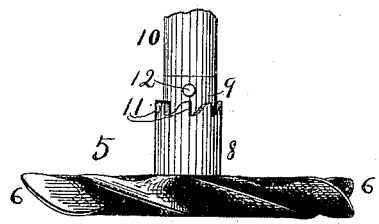
Fig II.
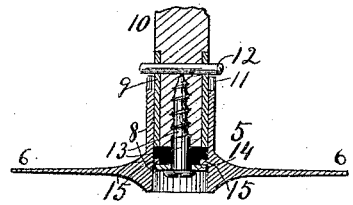
Fig III.
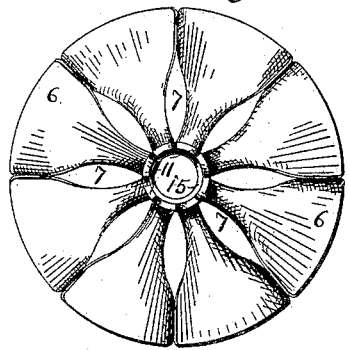
WITNESSES,
S. E. E. Stevens
P. E. Stevens
INVENTOR.
Isaac F. Sterling.
W. E. Stevens. Atty.

UNITED STATES PATENT OFFICE.

ISAAC F. STERLING, OF MARLIN, TEXAS.

CHURN-DASHER.

SPECIFICATION forming part of Letters Patent No. 446,718, dated February 17, 1891.

Application filed September 16, 1890. Serial No. 365,164. (No model.)

*To all whom it may concern:*

Be it known that I, ISAAC F. STERLING, a citizen of the United States, residing at Marlin, in the county of Falls and State of Texas, have invented certain new and useful Improvements in Churn-Dashers; and I do hereby declare the following to be a full, clear, and exact description of the invention, such as will enable others skilled in the art to which it appertains to make and use the same.

This invention relates to that class of churn-dashers which are adapted to be vertically reciprocated in common churn-bodies; and its object is to provide a dasher which will do the principal part of the churning on the downward stroke and meet with less resistance on the upward stroke, and which may be set to work more easily when the thickening of the cream as the butter begins to come naturally causes more resistance to its working.

To this end my invention consists in the construction and combination of parts forming a churn-dasher, hereinafter described and claimed, reference being had to the accompanying drawings, in which—

Figure I is a side elevation of a churn-dasher representing my invention. Fig. II is a vertical section of the same, and Fig. III is a plan or top view thereof.

5 represents the dasher having a series of spirally-slanting blades 6, all slanted one way like a screw-propeller. The outer ends of the blades are sufficiently broad to form a complete circle when viewed from above, as in Fig. III, but their front and rear edges are curved inward, forming vertical openings 7 with lancet-shaped ends.

8 is a socket formed upon and through the dasher to receive the tip 9 of the handle 10. This tip is usually made as a metallic ferrule or thimble to be driven tightly upon the handle, and it serves as a metal bearing for the dasher to revolve on. The socket 8 is provided with teeth 11 at its upper end, between which a lug or catch-pin 12, fixed upon or in the ferrule, may engage to prevent the dasher from revolving.

13 is a screw firmly secured in the end of the handle and holding a washer 14, which bears against a shoulder 15 in the socket, whereby the dasher is lifted with the handle. The screw 13 projects from the handle enough to permit the dasher about one-quarter of an inch of vertical play, so that when the handle is pushed downward it slips in the dasher until the pin or lug 12 engages the teeth 11, whereby the dasher is held from revolving, and the milk being partly permitted to pass straight through the openings 7 and partly forced to rotate by the spiral blades, is thrown into great commotion, and when the handle is pulled upward the lug or pin is first drawn out of engagement with the teeth, and the dasher is thus set free to be revolved spirally through the milk, thus again causing commotion by interrupting the currents formed by the downstroke, and producing such extreme agitation in the milk as tends to bring the butter quickly. Furthermore, when the milk begins to thicken with the coming butter, and it is found difficult to force the fixed dasher down through it, the dasher may be set free to revolve both ways by removing the catch-pin 12 entirely from the handle. Then the few remaining strokes required to complete the separation of butter from the milk may be easily made with the dasher revolving freely both ways.

It is evident that part of the advantages of my invention would be obtained if the catch-pin 12 were a permanently-fixed lug; also, that removable catches might be made in many different ways to substitute the removable catch-pin 12 and yet operate to engage the teeth 11 in the intermittent manner described.

Having thus fully described my invention, what I believe to be new, and desire to secure by Letters Patent, is the following:

The combination, in a churn-dasher, of a handle, a spiral-bladed head journaled thereon, means, substantially as described, for engaging the head with the handle in its descent and for setting the head free to revolve when ascending, the said blades forming a complete circle at their outer ends and curved inward on their radial edges, forming free vertical openings, substantially as described, whereby the cream at the circumference is pressed toward the center in spiral streams during the descent of the dasher-head and partially thrown away from center during its ascent.

In testimony whereof I affix my signature in presence of two witnesses.

ISAAC F. STERLING.

Witnesses:
Z. I. HARLAN,
GUY WILLIAMS.